(12) United States Patent
Inoue et al.

(10) Patent No.: US 9,639,980 B2
(45) Date of Patent: May 2, 2017

(54) IMAGE PROCESSING APPARATUS FOR DEM DATA AND METHOD OF IMAGE PROCESSING FOR DEM DATA

(71) Applicant: Japan Oil, Gas and Metals National Corporation, Tokyo (JP)

(72) Inventors: Makoto Inoue, Saitama (JP); Taro Yajima, Tokyo (JP)

(73) Assignee: Japan Oil, Gas and Metals National Corporation, Tokyo (JP)

( * ) Notice: Subject to any disclaimer, the term of this patent is extended or adjusted under 35 U.S.C. 154(b) by 0 days.

(21) Appl. No.: 14/845,148

(22) Filed: Sep. 3, 2015

(65) Prior Publication Data

US 2015/0379767 A1 Dec. 31, 2015

Related U.S. Application Data

(63) Continuation of application No. PCT/JP2014/055165, filed on Feb. 28, 2014.

(30) Foreign Application Priority Data

Mar. 7, 2013 (JP) .................................. 2013-044907

(51) Int. Cl.
*G06K 9/00* (2006.01)
*G06K 9/40* (2006.01)
(Continued)

(52) U.S. Cl.
CPC .............. *G06T 17/05* (2013.01); *G06T 5/002* (2013.01); *G06T 5/10* (2013.01); *G06T 5/20* (2013.01);
(Continued)

(58) Field of Classification Search
None
See application file for complete search history.

(56) References Cited

U.S. PATENT DOCUMENTS

2005/0286792 A1* 12/2005 Tadas ........................ G06T 5/20
382/261
2006/0036367 A1* 2/2006 Brewster ................ G01V 11/00
702/14

(Continued)

FOREIGN PATENT DOCUMENTS

JP 2003-005634 A 1/2003
JP 2004-093632 A 3/2004

OTHER PUBLICATIONS

International Search Report issued in PCT/JP2014/055165, mailed on Apr. 1, 2014, with translation (5 pages).
(Continued)

*Primary Examiner* — Randolph I Chu
(74) *Attorney, Agent, or Firm* — Nakanishi IP Associates, LLC

(57) ABSTRACT

An image processing apparatus comprises an acquiring section that acquires DEM data indicating digital elevation of each lattice-shaped area in a predetermined map region, a selecting section that selects at least one of a plurality of line filters that filters data which is continuous in one direction in the map region and a plurality of matrix filters that filters data constituting a two-dimensional region in the map region, a filter processing section that conducts filter processing of the DEM data acquired by the acquiring section by a filter selected by the selecting section, and an outputting section that outputs the DEM data after being filtered in the filter processing.

17 Claims, 13 Drawing Sheets

(51) Int. Cl.
*G06K 9/42* (2006.01)
*G06T 17/05* (2011.01)
*G06T 5/00* (2006.01)
*G06T 5/10* (2006.01)
*G06T 5/20* (2006.01)

(52) U.S. Cl.
CPC ............... *G06T 2207/10012* (2013.01); *G06T 2207/10028* (2013.01); *G06T 2207/10032* (2013.01)

(56) References Cited

U.S. PATENT DOCUMENTS

| | | | | |
|---|---|---|---|---|
| 2006/0140501 | A1* | 6/2006 | Tadas | G06T 5/20 382/260 |
| 2010/0009649 | A1* | 1/2010 | Huebner | H04L 25/0232 455/334 |
| 2010/0125591 | A1* | 5/2010 | Ben Tsvi | G06F 17/30067 707/758 |
| 2010/0318551 | A1* | 12/2010 | Lai | G06F 17/30867 707/765 |
| 2012/0082242 | A1* | 4/2012 | Narroschke | H04N 19/423 375/240.25 |
| 2013/0182780 | A1* | 7/2013 | Alshin | H04N 19/80 375/240.29 |

OTHER PUBLICATIONS

Written Opinion of International Search Authority issued in PCT/JP2014/055165, mailed on Apr. 1, 2014, with translation (8 pages).
International Preliminary Report on Patentability in PCT/JP2014/055165, issued on Sep. 8, 2015, with translation (5 pages).
SRTM90mDEM ni Taishite no Filter Koka ni Tsuite -Riten to Ketten-, published on Sep. 26, 2011 (6 pages).
Keisharyozu ni Okeru ASTERGDEM ni Taishite no Filter Koka ni Tsuite, published on Mar. 26, 2012 (3 pages).

* cited by examiner

| 0.625 | 0.625 | 0.625 |
|-------|-------|-------|
| 0.625 | 0.500 | 0.625 |
| 0.625 | 0.625 | 0.625 |

FIG. 5A

| 0.010 | 0.015 | 0.020 | 0.015 | 0.010 |
|-------|-------|-------|-------|-------|
| 0.015 | 0.025 | 0.040 | 0.025 | 0.015 |
| 0.020 | 0.040 | 0.500 | 0.040 | 0.020 |
| 0.015 | 0.025 | 0.040 | 0.025 | 0.015 |
| 0.010 | 0.015 | 0.020 | 0.015 | 0.010 |

FIG. 5B

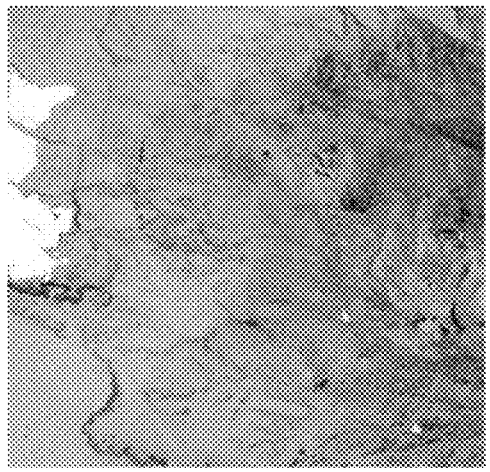
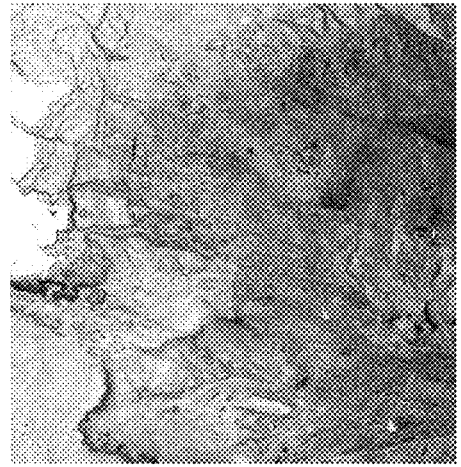
FIG. 9A        FIG. 9B
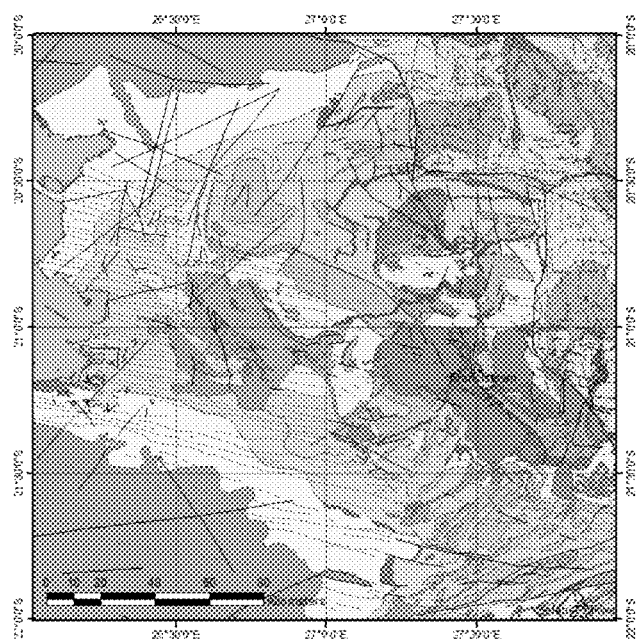
FIG. 10

IMAGE PROCESSING APPARATUS FOR DEM DATA AND METHOD OF IMAGE PROCESSING FOR DEM DATA

CROSS-REFERENCE TO RELATED APPLICATIONS

The present application is a continuation application of International Application No. PCT/JP2014/055165, filed on Feb. 28, 2014, which claims priority to Japanese Patent Application No. 2013-044907, filed on Mar. 7, 2013. The contents of these applications are incorporated herein by reference in their entirety.

BACKGROUND OF THE INVENTION

Conventionally, Digital Elevation Model (DEM) data indicating digital elevation of each lattice-shaped region in a predetermined map region generated by using stereo pair images obtained from an aircraft, a satellite, and the like by using a remote sensing technology is provided. For example, DEM data generated from the Shuttle Radar Topography Mission (SRTM) and DEM data generated from the Advanced Spaceborne Thermal Emission and Reflection Radiometer (ASTER) are known.

Recently, topographical analyses are conducted by computers using these pieces of DEM data, and for example, an analysis of the geological structure based on a slope gradation map generated by using these pieces of DEM data has been proposed.

However, the DEM data generated by using the remote sensing technology contains noise components due to a fluctuation of an orbit of a satellite and lack of accuracy of stereo pair images. Further, when stereo pair images for generating the DEM data are acquired on different dates and times, atmospheric influences and the like cause differences between these images and noise components are contained therein. These noise components cause errors in the digital elevation at each point contained in the DEM data, and lead to a decrease in the accuracy of the analysis of the geological structure.

In Non-Patent Document 1, the inventors of the present invention proposed a method for removing noise components in SRTM DEM by conducting a process with a matrix filter for smoothing elevation data that constitutes a two-dimensional region in a map region by using the weighted moving average method or conducting a process with a line filter that filters data which is continuous in one direction in a map region.

Non-Patent Document 1: Makoto INOUE, Taro YAJIMA, "The filter effect on SRTM90mDEM—Advantages and Disadvantages—," The Mining and Materials Processing Institute of Japan, Journal of the Spring Conference, 2011, (I) Resources, A12-1

When conducting high-accuracy analyses on the geological structures in a wide region, it is required to appropriately remove noise from many pieces of DEM data corresponding to each of these map regions. However, because trends of noise contained in these pieces of DEM data are different according to terrains indicated by the DEM data, atmospheric influences, and the like, a filter suitable for a certain piece of DEM data is not necessarily suitable for another piece of DEM data.

BRIEF SUMMARY OF THE INVENTION

Accordingly, it is desired to efficiently select one or more than one filter from a plurality of effective line filters and a plurality of effective matrix filters as a filter which is suitable for removing noises from each piece of a plurality of pieces of DEM data.

The image processing apparatus according to one aspect of the present invention comprises an acquiring section that acquires DEM data indicating digital elevation of each lattice-shaped area in a predetermined map region, a selecting section that selects at least one of a plurality of line filters that filters data which is continuous in one direction in the map region and a plurality of matrix filters that filters data constituting a two-dimensional region in the map region, a filter processing section that conducts filter processing of the DEM data acquired by the acquiring section by a filter selected by the selecting section, and an outputting section that outputs the DEM data after being filtered in the filter processing.

The image processing method according to one aspect of the present invention comprises acquiring DEM data indicating digital elevation of each lattice-shaped area in a predetermined map region, selecting at least one of a plurality of line filters that filters data which is continuous in one direction in the map region and a plurality of matrix filters that filters data consisting a two-dimensional region in the map region, conducting filter processing of the DEM data acquired by the acquiring by a filter selected by the selecting, and outputting the DEM data after being filtered in the filter processing.

An image processing program stored in a non-transitory computer-readable storage medium according to one aspect of the present invention causes a computer to execute acquiring DEM data indicating digital elevation of each lattice-shaped region in a predetermined map region, selecting at least one of a plurality of line filters that filters data which is continuous in one direction in the map region and a plurality of matrix filters that filters data consisting a two-dimensional region in the map region, conducting filter processing of the DEM data acquired by the acquiring by a filter selected by the selecting, and outputting the DEM data after being filtered in the filter processing.

BRIEF DESCRIPTION OF THE DRAWINGS

FIG. 5A shows a table showing an example of a weight coefficient of a 3×3 matrix of a weighted-moving-average filter.

FIG. 5B shows a table showing an example of a weight coefficient of a 5×5 matrix of a weighted-moving-average filter.

FIG. 9A shows a slope gradation map generated by the SRTM DEM before filter processing.

FIG. 9B shows a slope gradation map generated by the SRTM DEM after the filter processing.

FIG. 10 shows a geologic map of the same region as the slope gradation map shown in FIG. 9A and FIG. 9B.

DETAILED DESCRIPTION OF THE INVENTION

Hereinafter, the present invention is described though the exemplary embodiment but the undermentioned embodiment does not limit the invention according to the claims and all of the combinations of characteristics described in the embodiment are not necessarily essential for a solution of the invention.

First Exemplary Embodiment

[Configuration Example of Image Processing Apparatus 1]

Figure 1:
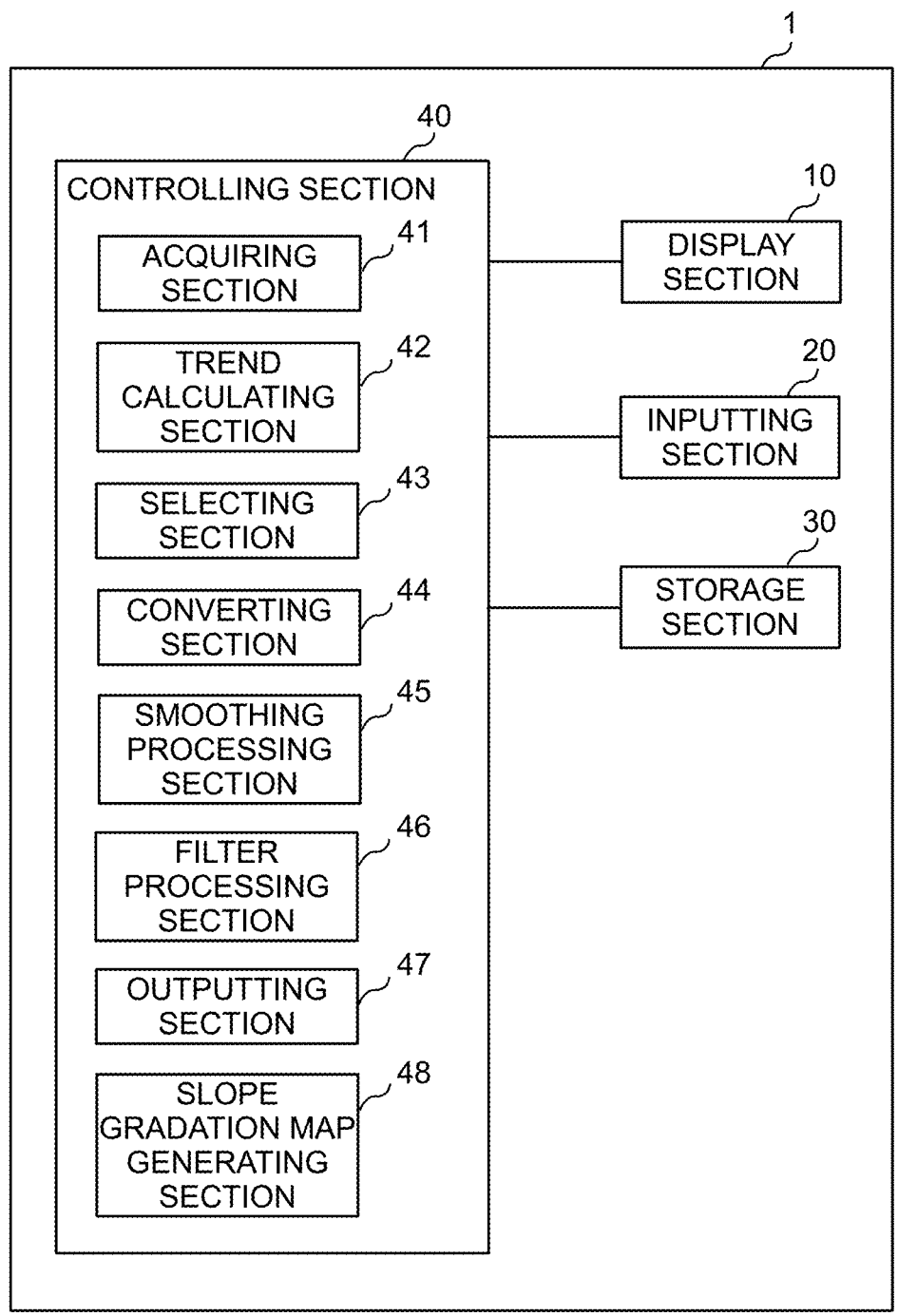
FIG. 1 shows a function configuration of an image processing apparatus according to the present exemplary embodiment.

FIG. 1 shows a function configuration of an image processing apparatus 1 according to the present exemplary embodiment. The image processing apparatus 1 includes a display section 10, an inputting section 20, a storage section 30, and a controlling section 40.

The display section 10 contains, for example, a flat panel display. The display section 10 displays various pieces of information in response to control by the control section 40. The inputting section 20 contains, for example, a mouse and a keyboard. The inputting section 20 accepts an input of various pieces of information from a user and outputs the accepted information to the controlling section 40.

The storage section 30 contains, for example, a ROM, a RAM, a hard disk, and the like. The storage section 30 stores various programs (not shown in the figure) for operating the image processing apparatus 1. The storage section 30 stores, for example, DEM data and a program regarding a line filter and a matrix filter.

Further, the storage section 30 stores i) information indicating a trend of terrain, ii) a filter name of a filter suitable for the trend of terrain, and iii) an order of filter processing with this filter in association with each other as filter information of each trend.

That is, the storage section 30 stores information indicating one trend of terrain in association with at least a file name of a filter and at least a coefficient. Further, the storage section 30 stores i) a position of a predetermined map region indicated by DEM data which is described further below and ii) the number of pieces of ASTER data utilized for generating ASTER GDEM data at the position in association with each other as information of the number of pieces of generated data. Here, the number of pieces of generated data may be equal to the number of pieces of ASTER data utilized for generating the ASTER GDEM data, or may be information obtained by digitizing "many," "fairly many," "few," and the like.

The controlling section 40 contains, for example, a central processing unit (CPU). The controlling section 40 controls functions of the image processing apparatus 1 by executing various programs for operating the image processing apparatus 1 stored in the storage section 30. Specifically, the controlling section 40 contains an acquiring section 41, a trend calculating section 42, a selecting section 43, a converting section 44, a smoothing processing section 45, a filter processing section 46, an outputting section 47, and a slope gradation map generating section 48.

The acquiring section 41 acquires DEM data indicating digital elevation of each lattice-shaped region in a predetermined map region. Specifically, the acquiring section 41 displays a screen for acquiring the DEM data on the display section 10 of the image processing apparatus 1, and accepts a location for storing the DEM data through the screen. Then, the acquiring section 41 acquires the DEM data referring to the accepted location for storing the DEM data.

The DEM data is generated by using stereo pair images obtained from an aircraft, a satellite, and the like by using remote sensing technology. The DEM data is, for example, SRTM DEM and ASTER GDEM.

The SRTM DEM is high-accuracy DEM data having relatively little noise generated on the basis of stereo pair images acquired in parallel at the same time from a space shuttle by using two radar sensors.

The ASTER GDEM is generated on the basis of stereo pair images acquired at different timings by using a nadir looking optical sensor and a backward looking optical sensor equipped on the ASTER sensor. Because these stereo pair images are acquired at different timings, there are cases where the images are influenced by a difference of atmospheric conditions and the like at the times of photographing. Accordingly, the ASTER GDEM has more noise components compared to the SRTM DEM.

Further, there are cases where the data value of each point of these pieces of DEM data contains various noise components such as an orbit fringe, rough noise over a wide range, and local spike noise.

Figure 2:
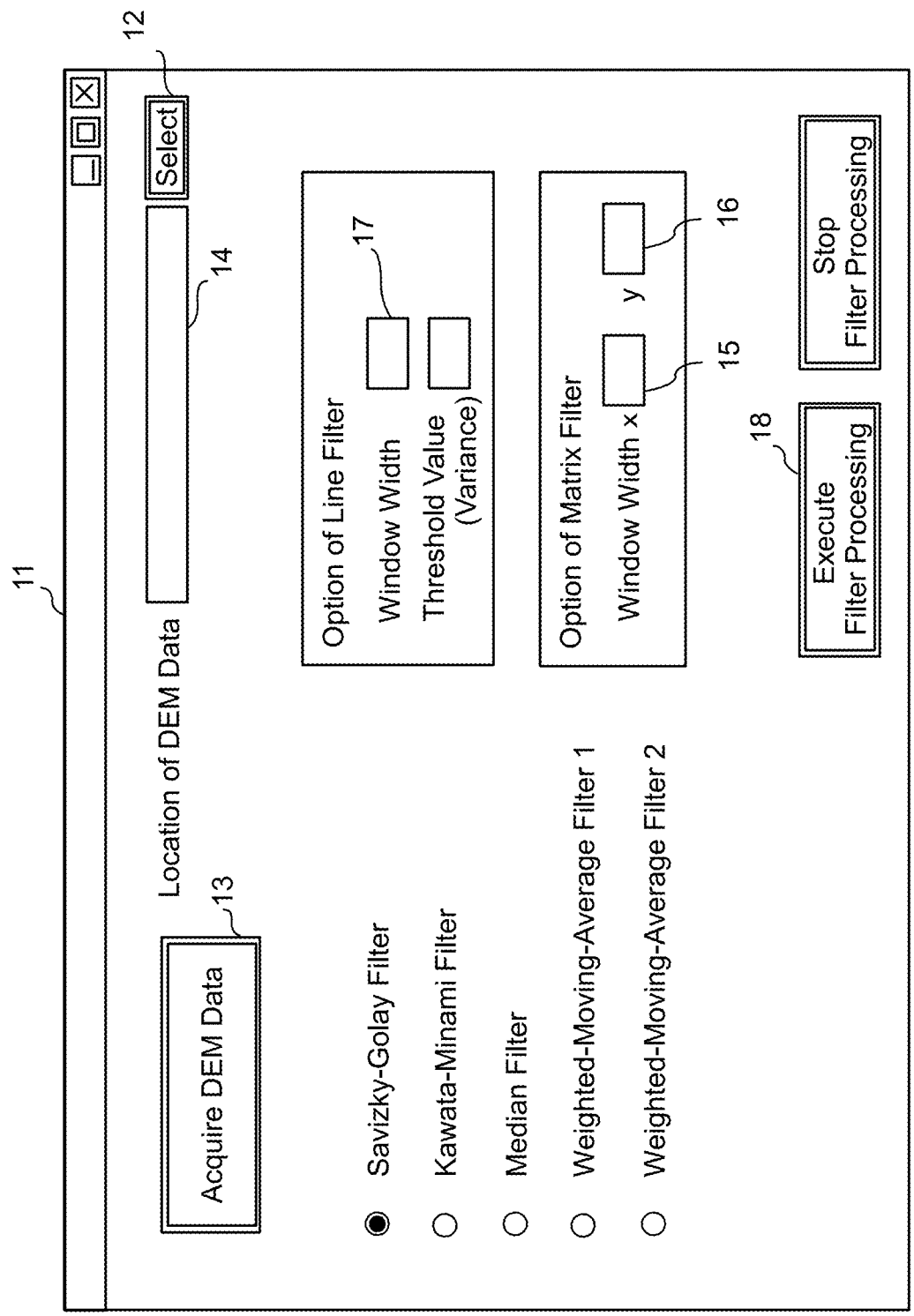
FIG. 2 shows an example of a screen for acquiring DEM data.

FIG. 2 shows an example of a screen 11 for acquiring DEM data.

As shown in FIG. 2, the screen 11 is provided with a selecting button 12 and an acquiring button 13. The acquiring section 41 displays a dialog for accepting an input of information indicating the location of the DEM data on the display section 10 when the selecting button 12 is pressed. The acquiring section 41 displays the accepted information on an input field 14 when the input is accepted. The acquiring section 41 acquires the DEM data on the basis of this inputted information when an acquiring button 13 is pressed in a condition where information accepted by the dialog is inputted into the input field 14. Further, in the present exemplary embodiment, the acquiring section 41 shall acquire the DEM data in a raster data format.

The trend calculating section 42 calculates a trend of terrain in a predetermined map region indicated by the DEM data acquired by the acquiring section 41. Specifically, the trend calculating section 42 calculates a digital elevation in the predetermined map region on the basis of a lattice-shaped data value that constitutes the DEM data acquired by the acquiring section 41 and calculates the trend of terrain on the basis of this digital elevation. The trend calculating section 42 calculates an average of slope amounts, a standard deviation of the elevation, a variance of the elevation, and an average of the relief energy of the predetermined map region as the trend of terrain on the basis of this digital elevation. Here, the trend calculating section 42 may determine whether the predetermined map region is a mountainous region or a flat region on the basis of this average of the slope amounts.

Further, the trend calculating section 42 may divide the predetermined map region into a plurality of regions and may calculate the trend of terrain of each of the plurality of regions. For example, the trend calculating section 42 may determine the number of divisions according to the number of pieces of data that constitutes the predetermined region, or may determine the number of divisions by accepting the number of divisions through the inputting section 20.

The selecting section 43 selects at least one of a plurality of line filters and a plurality of matrix filters. Specifically, the selecting section 43 selects at least one of the plurality of line filters and the plurality of matrix filters on the basis of the trend of terrain calculated by the trend calculating section 42. That is, the selecting section 43 references the filter information of each trend stored in the storage section 30 and specifies a filter name of a filter associated with the trend of terrain calculated by the trend calculating section 42 and an order of filter processing by the filter. Accordingly, the selecting section 43 selects at least one of the plurality of line filters and the plurality of matrix filters.

Further, when the trend of terrain of each of the plurality of regions that constitutes the predetermined map region is calculated by the trend calculating section 42, the selecting section 43 selects a filter that corresponds to each region in this plurality of regions on the basis of the trend of terrain calculated for each of the plurality of the regions.

Here, a line filter and a matrix filter are described.
The line filter refers to a filter that filters data which is continuous in one direction (for example, in the east-west direction or in the north-south direction) in a map region indicated by DEM data. In the present exemplary embodiment, for example, an adapting-smoothing filter (a Kawata-Minami filter) and a polynomial-fitting-smoothing filter (a Savitzky-Golay filter) are used as the line filter.

The adapting-smoothing filter is a filter that smooths only a section with a large variance without changing the maximum value of data values that constitute a section to be filtered. Because the adapting-smoothing filter does not change the maximum value, the filter has a characteristic of not smoothing a data value much greater than ambient values, that is, data values containing spike noise.

The polynomial-fitting-smoothing filter is a filter that modifies values by approximating a polynomial by using the least squares method in which weights are added to each of the data values in a filtering target section assuming that all pieces of data are uncertain.

The matrix filter is a filter that filters data that constitutes a two-dimensional region in a map region. In the present exemplary embodiment, for example, a median filter, a weighted-moving-average filter, and the like are used as the matrix filter.

The median filter is a filter that calculates the data value located in the middle when the data values are arranged in an ascending order in a two-dimensional region (for example, a 3×3 region or a 5×5 region centered around the data to be converted) and converts a data value in the center of the two-dimensional region into an intermediate data value. The median filter is an effective filter for removing spotty noise.

The weighted-moving-average filter is a filter that calculates the average value by assigning weights to each of the data values that constitute a two-dimensional region (for example, a 3×3 region or a 5×5 region centering around the data to be converted) and converts the data value in the center of the two-dimensional region into the average value. The weighting value of the data value of the center of the two-dimensional region of the weighted-moving-average filter used in the present exemplary embodiment is set to be smaller than those of other pieces of data in the two-dimensional region.

Further, a size of the two-dimensional region of the matrix filter (hereinafter, the size of the two-dimensional region is referred to as a "window width") shall be set previously but it can be changed through the inputting section 20. For example, the input fields 15 and 16 in FIG. 2 are text boxes for accepting inputs of the window width of the matrix filter. The input field 15 accepts an input of the window width of the X-axis (east-west direction) and the input field 16 accepts an input of the window width of the Y-axis (north-south direction). The selecting section 43 may determine the window width on the basis of the values inputted into the input fields 15 and 16.

Moreover, the selecting section 43 may change a filter coefficient such as a weighting value used in a filter to be selected on the basis of the trend of terrain calculated by the trend calculating section 42.

Furthermore, the selecting section 43 may select a filter on the basis of a type of the DEM data. For example, when the DEM data is SRTM DEM, the selecting section 43 may select the line filter preferentially. Further, when the DEM data is ASTER GDEM, the matrix filter and the line filter may be selected. In this case, a type of the DEM data and a file name of a filter suitable for this type may be previously stored in association with each other in the storage section 30, and the selecting section 43 may select a filter associated with the type by distinguishing a type of the DEM data acquired by the acquiring section 41. Moreover, the selecting section 43 may change a filter to be selected according to the number of pieces of data that constitutes the DEM data or an enlarged/reduced state of the DEM data.

Furthermore, the selecting section 43 may accept a selection of the filter through the inputting section 20 and may accept a further selection of the filter from among filters selected by the selecting section 43 through the inputting section 20. For example, as shown in FIG. 2, the selecting section 43 may be provided with buttons for accepting a selection of each filter and may select a filter according to a selection state of the buttons.

The converting section 44 converts the DEM data in a raster data format acquired by the acquiring section 41 into the DEM data in a text data format. Further, the converting section 44 converts the DEM data in the text data format filtered by the filter processing section 46 into the DEM data in the raster data format.

The smoothing section 45 smooths data having the maximum value in a predetermined window width in the DEM data acquired by the acquiring section 41. The window width in this case is a number of pieces of data which is continuous in one direction in the data that constitutes the DEM data. That is, the smoothing section 45 divides the data that constitutes the DEM data into a predetermined number of pieces of data which are continuous in one direction, and smooths each set of the predetermined number of pieces of data.

Figure 3A:
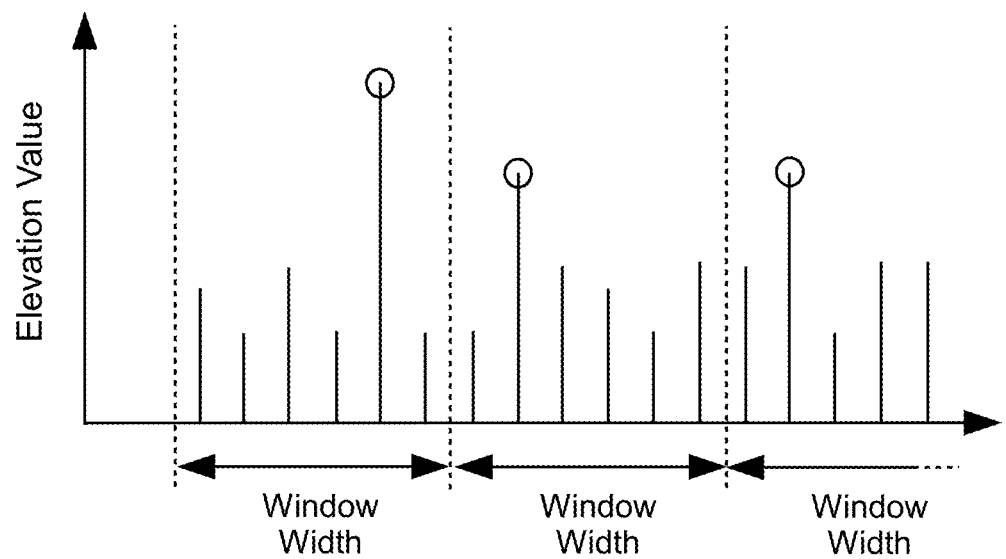
FIG. 3A shows an example of elevation data in DEM data before processing of a smoothing processing section.
Figure 3B:
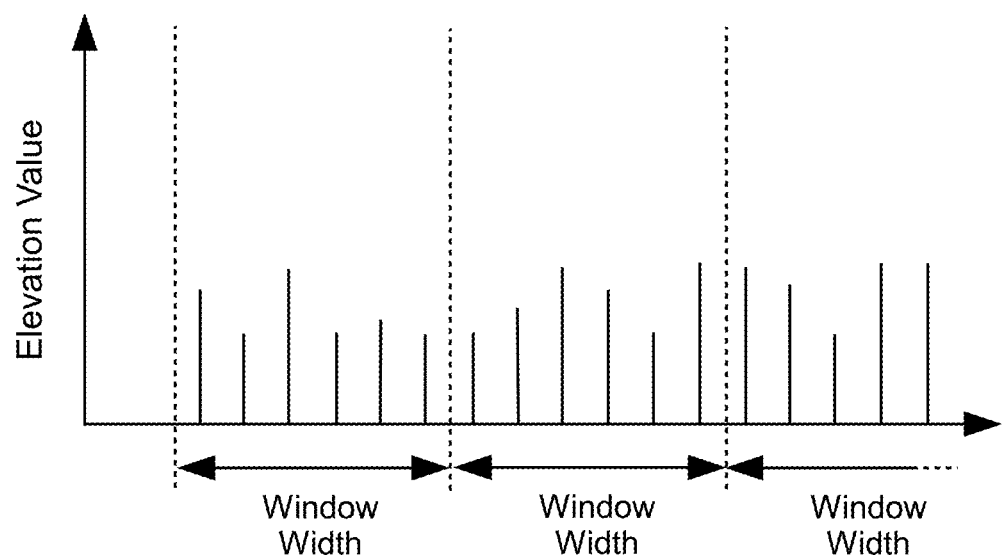
FIG. 3B shows an example of elevation data in DEM data after the processing of the smoothing processing section.

An example of processing of the smoothing processing section 45 is described by using FIG. 3. FIG. 3 shows an example of processing of the smoothing processing section 45. The smoothing processing section 45 determines data in the window width in the DEM data as a range to be smoothed. FIG. 3A shows an example where the range to be smoothed is determined by making the window width to be 6. Then, the smoothing section 45 converts the maximum value of the data in the window width into the average value of the data values of the data contained in the range or the value obtained by the polynomial-fitting-smoothing (a Savitzky-Golay method). Further, the smoothing processing section 45 calculates the average value or the value obtained by the polynomial-fitting-smoothing (a Savitzky-Golay method) after excluding the data with the maximum value. Next, the smoothing processing section 45 shifts the range to be smoothed and conducts the smoothing in the shifted range. FIG. 3B shows an example where the data with the maximum value in each of the window widths shown in FIG. 3A is converted into the average value of the data values of the data contained in the window width. In this manner, the smoothing processing section 45 smooths the DEM data over the entire data range.

The smoothing processing section 45 may determine the window width that prescribes a range of data to be smoothed at one time of smoothing on the basis of the trend of terrain calculated by the trend calculating section 42. For example, the storage section 30 may store the trend of terrain in association with the window width corresponding to this trend of terrain, and the smoothing processing section 45 may refer to the storage section 30 and may specify the window width corresponding to the trend of terrain calculated by the trend calculating section 42. For example, the window width corresponding to the trend of terrain is determined to be a narrow range with respect to an expected width of variations of the terrain.

Further, the smoothing processing section 45 may accept the window width through the inputting section 20. For example, the input field 17 in FIG. 2 is a text box for accepting an input of the window width of the line filter. The smoothing processing section 45 may determine the window width of the line filter on the basis of the value inputted by the input field 17.

Further, the smoothing processing section 45 may display a result of the processing on the display section 10 in real time when smoothing the entire DEM data. For example, when a smoothing of the entire DEM data is conducted a plurality of times, the smoothing processing section 45 may overwrite the displayed result of the processing with the new result of the smoothing processing and may display the new result. In this manner, the user can know the status of the removal of noise during the smoothing processing.

Further, the smoothing processing section 45 may determine the number of times the smoothing is performed on the basis of the trend of terrain calculated by the trend calculating section 42. That is, the smoothing processing section 45 may repeat the smoothing processing of all the data in the DEM data for a plurality of times. For example, in the ASTER DEM data, the terrain whose average slope amount is 5° or less is likely to contain spike noise. Accordingly, when the average slope amount calculated by the trend calculating section 42 is 5° or less, the smoothing processing section 45 determines to perform the smoothing a greater number of times than in the case when the average slope amount is more than 5°. Further, the storage section 30 may store the average slope amount and the number of times smoothing is performed in association with each other, and the smoothing processing section 45 may acquire the number of times smoothing is performed corresponding to the average slope amount calculated by the trend calculating section 42.

Further, the smoothing processing section 45 may smooth in one direction in the predetermined map region indicated by the DEM data, may also smooth in a direction orthogonal to the one direction, and may calculate the average value of each of the results of the smoothing. That is, the smoothing processing section 45 smooths in a north-south direction in the predetermined map region indicated by the DEM data as well as in an east-west direction. Then, the smoothing processing section 45 determines the data value of each piece of data that constitutes the DEM data as the average value of the data value of the data calculated by the smoothing in the north-south direction and the data value of the data calculated by the smoothing in the east-west direction.

Further, the smoothing processing section 45 may smooth in one direction in the predetermined map region indicated by the DEM data and may smooth the smoothed data in a direction orthogonal to the one direction. In this manner, for example, the image processing apparatus 1 can remove spike noise even when a plurality of instances of spike noise are contained continuously in the data in the window width of the east-west direction by smoothing the data in the window width of the north-south direction.

Further, the smoothing processing section 45 may specify the number of pieces of ASTER data used for generating the ASTER GDEM data acquired by the acquiring section 41 by referring to the storage section 30, and may decide the number of times the smoothing is performed on the basis of the specified number of pieces of ASTER data. For example, the smoothing processing section 45 may reduce the number of times smoothing is performed when the specified number of pieces of ASTER data is large because the spike noise was likely to be removed from the DEM data, and may increase the number of times smoothing is performed when the specified number of pieces of ASTER data is small. That is, the smoothing processing section 45 may perform the smoothing a smaller number of times when the specified number of pieces of ASTER data is large than when the specified number of pieces of ASTER data is small.

The filter processing section 46 conducts filter processing of the DEM data, which was acquired by the acquiring section 41 and was smoothed by the smoothing processing section 45, by using a filter selected by the selecting section 43. Here, when a plurality of filters are selected by the selecting section 43, the filter processing section 46 conducts the filter processing of the DEM data according to an order of the filters determined by the selecting section 43. Further, the filter processing section 46 shall conduct the filter processing of the DEM data converted into text data.

Furthermore, when the filtering is conducted by using a line filter, the filter processing section 46 may conduct the filtering in one direction in the predetermined map region indicated by the DEM data as well as in a direction orthogonal to the one direction and may calculate the average value of the results of each filtering.

Moreover, the filter processing section 46 may accept an instruction to conduct the filter processing through the inputting section 20. For example, an executing button 18 shown in FIG. 2 is a button for accepting the instruction to conduct the filter processing by the filter processing section 46. The filter processing section 46 may conduct the filter processing of the DEM data in response to pressing of this executing button 18.

The outputting section 47 outputs the DEM data that has been filtered by the filter processing section 46 and has been converted into a raster data format by the converting section 44 to a file. Specifically, the outputting section 47 generates a file with a file name made by appending identification information of the filter selected by the selecting section 43 to a file name of a file that stores the DEM data before the filter processing, and outputs the DEM data after being filtered in the filter processing to the file.

For example, the outputting section 47 may add an extension for identifying a filter to the tail end of a file name of a file that stores the DEM data that was filtered in the filter processing and was converted into a raster data format in an order of the filter processing of the filter. Further, the outputting section 47 may add information indicating the window widths used in the smoothing processing section 45 to the file name of the DEM data that was filtered in the filter processing.

The slope gradation map generating section 48 generates a slope gradation map of the DEM data outputted by the outputting section 47. The slope gradation map generating section 48 generates the slope gradation map by converting, for example, the data value of each piece of data that constitutes the DEM data outputted by the outputting section 47 into image data by using an edge emphasizing filter and the like. Here, the slope gradation map generating section 48 may generate the slope gradation map by conducting edge emphasizing on each piece of data by using a Sobel method, a Prewitt method, or a Robert method (cf. Non-Patent Document 1). Further, the slope gradation map generating section 48 may display the generated slope gradation map in the display section 10.

Figure 4:
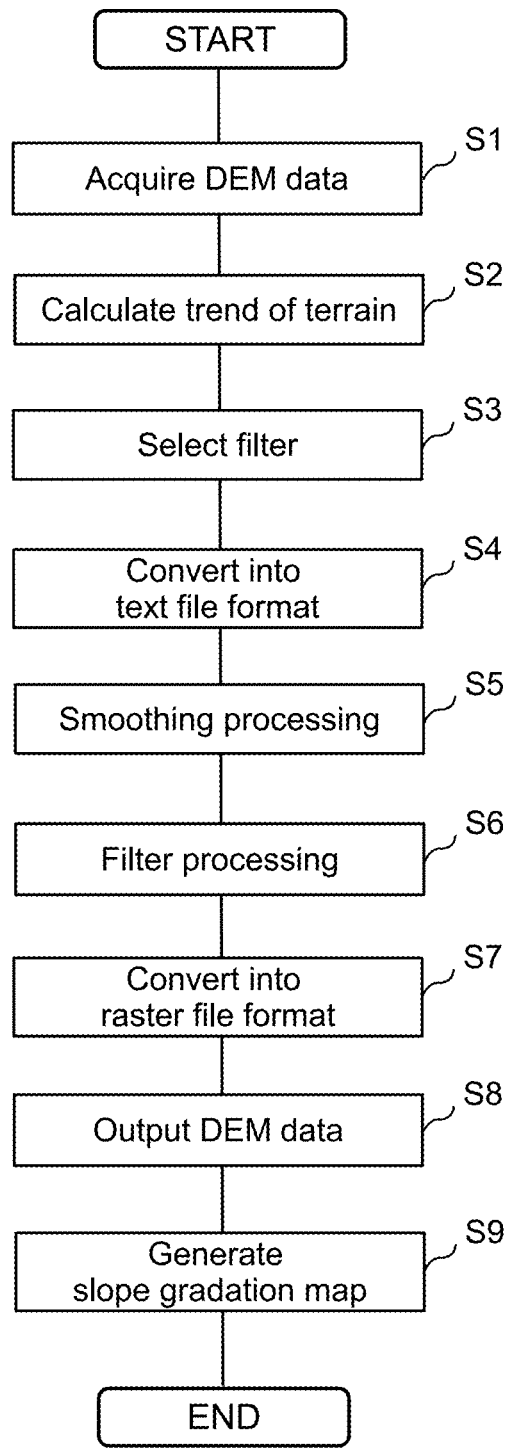
FIG. 4 shows a flowchart of a flow of processing of a controlling section of the image processing apparatus.

Next, an example of a flow of processing by the controlling section 40 of the image processing apparatus 1 is described. FIG. 4 shows a flowchart of a flow of processing of controlling section of the image processing apparatus. First, the acquiring section 41 acquires the DEM data in a raster file format (S1). Next, the trend calculating section 42 calculates the trend of terrain in the predetermined map region indicated by the DEM data acquired by the acquiring section 41 (S2). Next, the selecting section 43 selects at least one filter from a plurality of line filters and a plurality of matrix filters on the basis of the trend of terrain calculated by the trend calculating section 42 (S3). Next, the converting section 44 converts the DEM data acquired by the acquiring section 41 into the DEM data in a text file format (S4).

Next, the smoothing processing section 45 smooths the DEM data converted into the text file format (S5). Next, the filter processing section 46 conducts filter processing of the DEM data, which has been smoothed by the smoothing processing section 45, by using the filter selected by the selecting section 43 (S6). Next, the converting section 44 converts the DEM data after being filtered in the filter processing into the DEM data in the raster file format (S7). Next, the outputting section 47 outputs the DEM data converted into the raster file format by the converting section 44 to a file (S8). In this case, the outputting section 47 adds an extension for identifying filters to the file name. Next, the slope gradation map generating section 48 generates a slope gradation map of the DEM data outputted by the outputting section 47 (S9).

[Example of an Application to Actual Data]

Figure 6A:
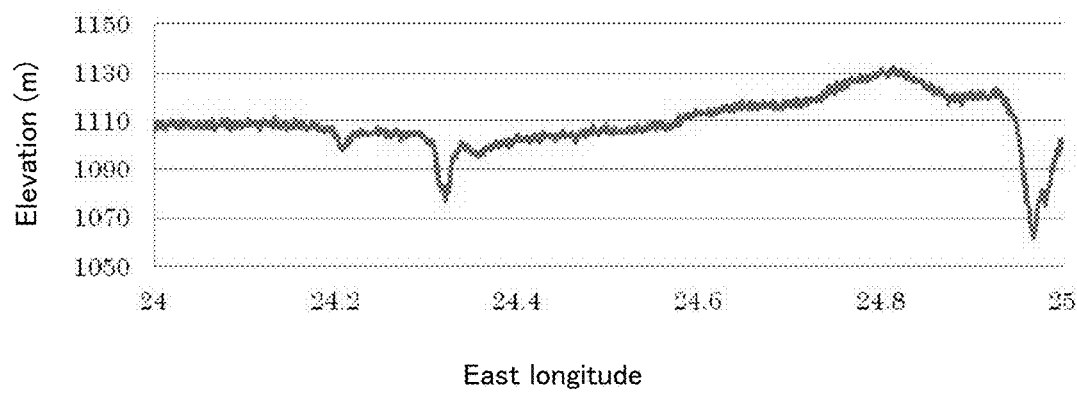
FIG. 6A shows noise in elevation data in DEM data.
Figure 6B:
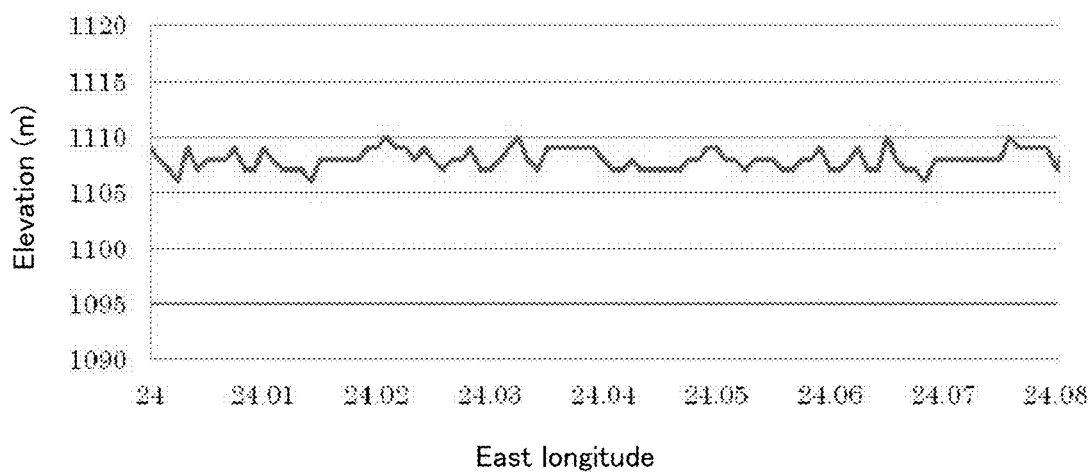
FIG. 6B shows noise in elevation data in DEM data.
Figure 6C:
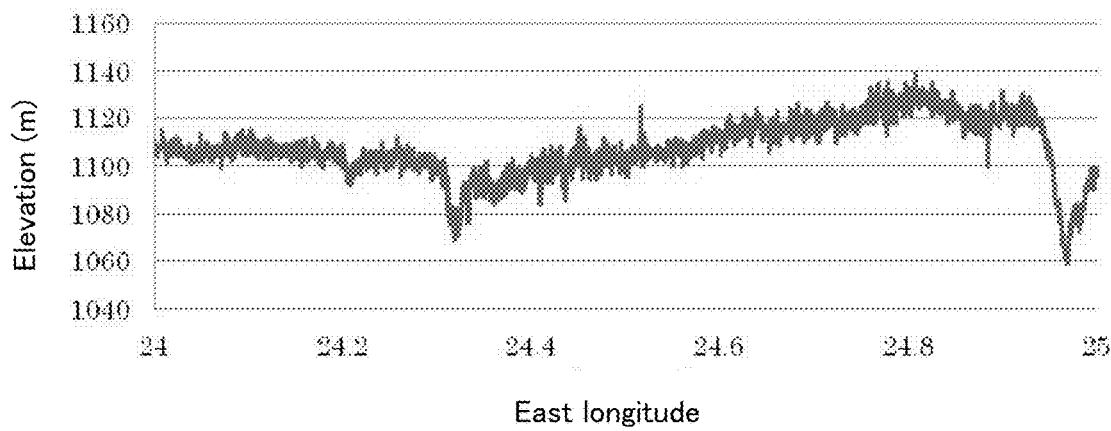
FIG. 6C shows noise in elevation data in DEM data.
Figure 6D:
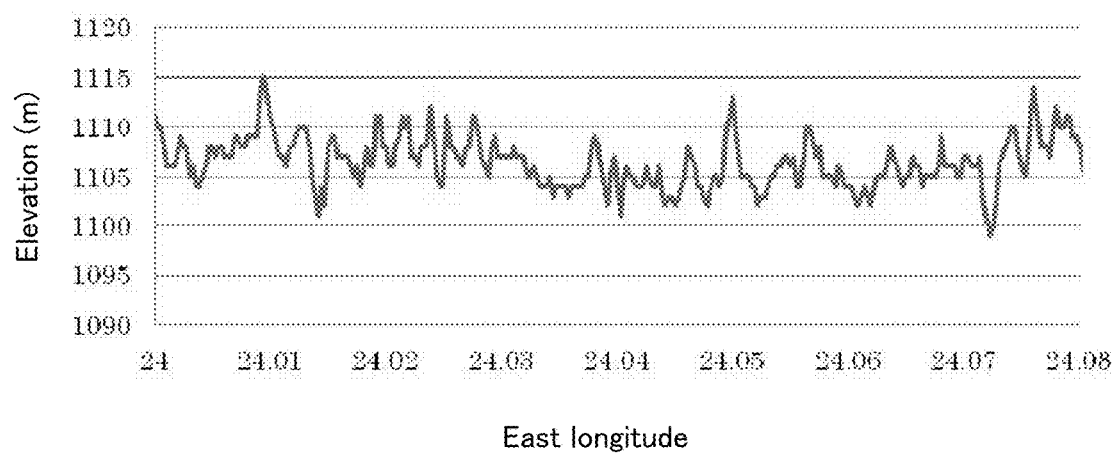
FIG. 6D shows noise in elevation data in DEM data.

FIG. 5A shows a table showing an example of a weight coefficient of a 3×3 matrix of a weighted-moving-average filter. FIG. 5B shows a table showing an example of a weight coefficient of a 5×5 matrix of a weighted-moving-average filter. FIG. 6A to FIG. 6D show noise in elevation data in the DEM data. The horizontal axis represents the east longitude and the vertical axis represents the elevation (meters). FIG. 6A shows 1201 elevation data values of the SRTM DEM indicating elevations between the predetermined two points. FIG. 6B shows 100 elevation data values whose origin is one of the two points among the data values of the two points shown in FIG. 6A. FIG. 6C shows 3601 elevation data values of the ASTER GDEM in the same section as shown in FIG. 6A. FIG. 6D shows 300 data values of the ASTER GDEM in the same section shown in FIG. 6B.

As known by comparing FIG. 6A and FIG. 6B, the noise in the elevation data of the ASTER GDEM is larger than the noise in the elevation data of the SRTM DEM. Further, as shown in FIG. 6D, the maximum width of the noise in the elevation data of the ASTER GDEM is about 15 meters. Further, by comparing FIG. 6A and FIG. 6C, the data having spike noise whose data value changes remarkably compared to the circumference data can be seen in the ASTER GDEM.

Figure 7A:
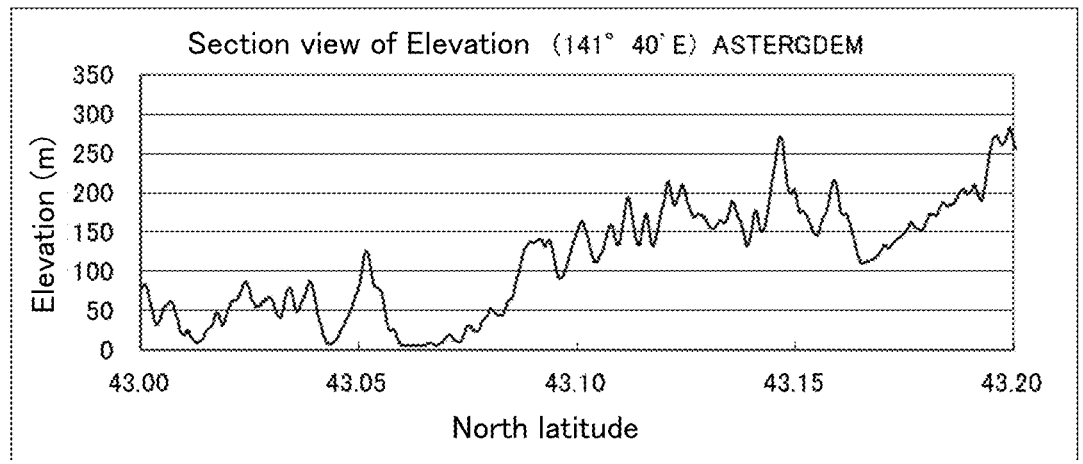
FIG. 7A shows an example where smoothing processing is applied.
Figure 7B:
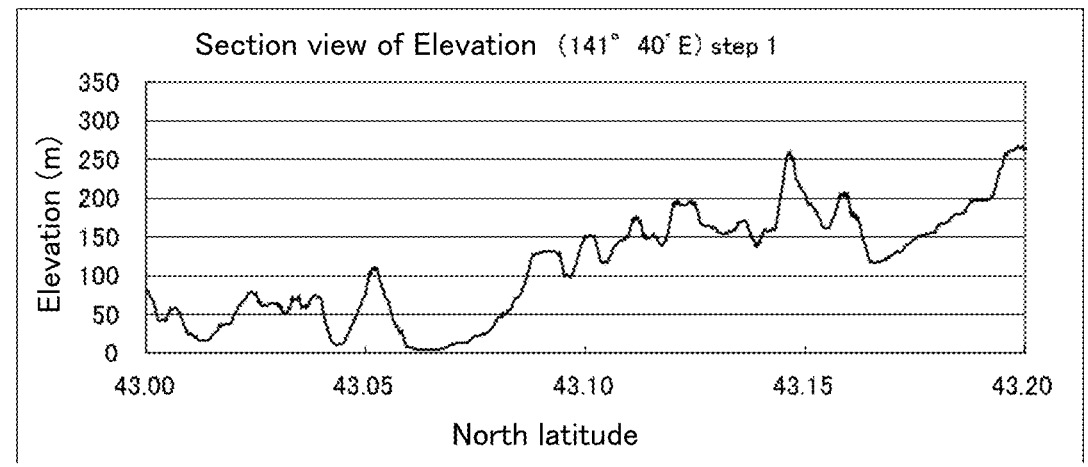
FIG. 7B shows an example where smoothing processing is applied.
Figure 7C:
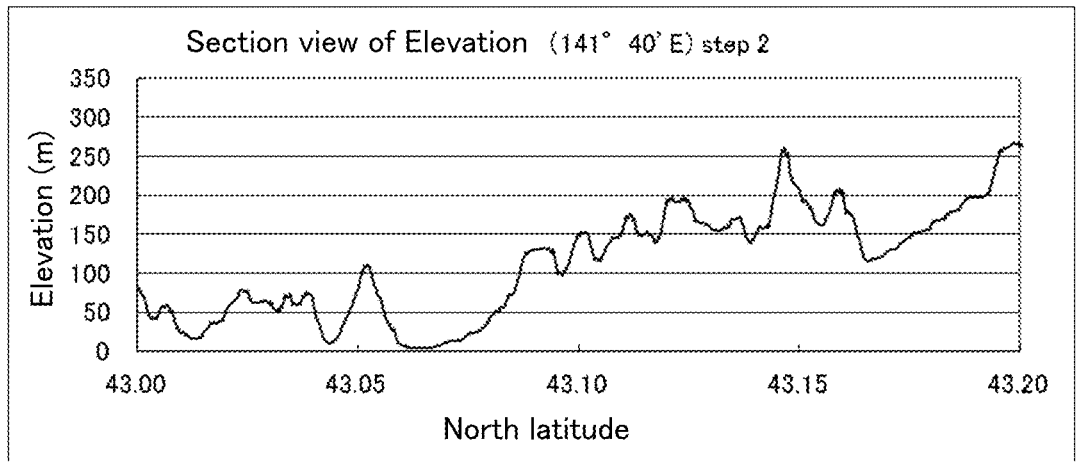
FIG. 7C shows an example where smoothing processing is applied.

FIG. 7A to FIG. 7G show examples where smoothing processing by the smoothing processing section 45 is applied. The horizontal axis represents the north latitude and the vertical axis represents the elevation (meters). Specifically, FIG. 7A shows the first piece of data to the 1500th piece of data among the 3601 elevation data values of the ASTER GDEM shown in FIG. 6C. FIG. 7B shows the data after the smoothing processing, which exchanges the maximum value and the minimum value with the average value, is performed three times on the ASTER GDEM data shown in FIG. 7A. FIG. 7C shows the data after the smoothing processing, which exchanges the maximum value and the minimum value with the polynomial-fitting-smoothing value, is performed three times on the data shown in FIG. 7B.

Figure 7D:
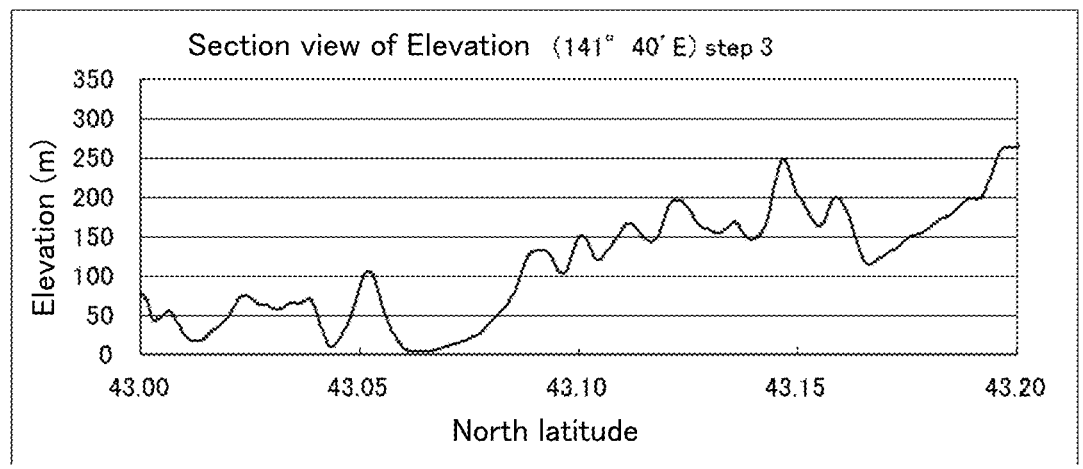
FIG. 7D shows an example where smoothing processing is applied.
Figure 7E:
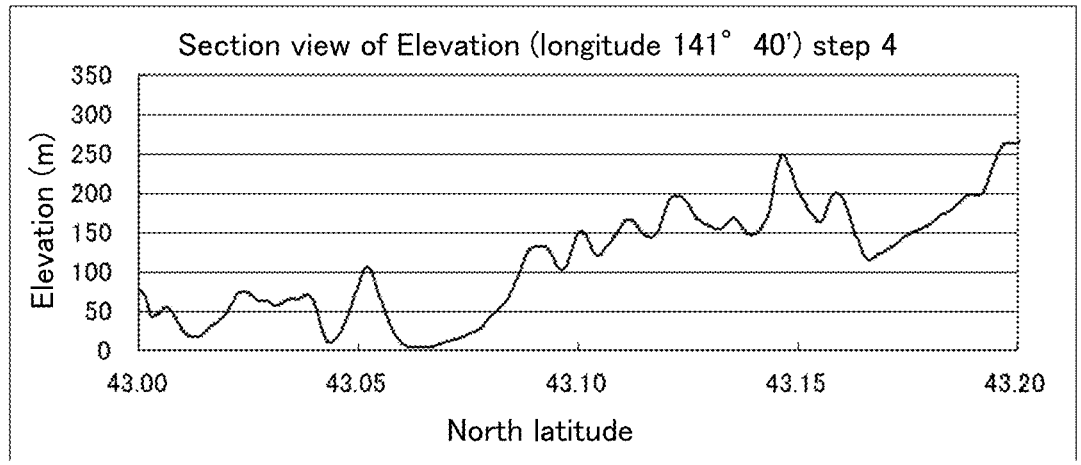
FIG. 7E shows an example where smoothing processing is applied.
Figure 7F:
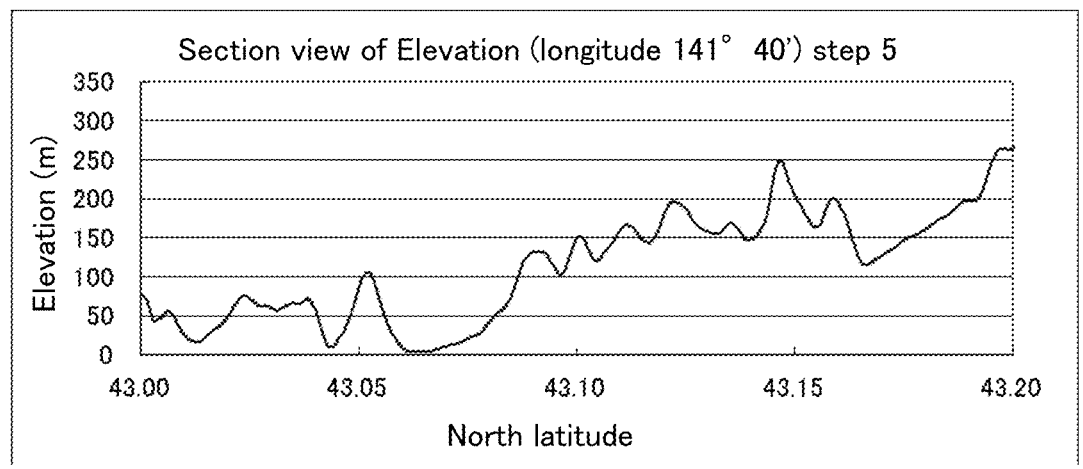
FIG. 7F shows an example where smoothing processing is applied.

FIG. 7D shows the data after the smoothing processing by a polynomial-fitting-smoothing filter (Savitzky-Golay) is performed once on the data shown in FIG. 7C. FIG. 7E shows the data after the smoothing processing by using an adapting-smoothing filter (a Kawata-Minami) is performed once on the data shown in FIG. 7D. FIG. 7F shows the data after the smoothing processing by using the weighted moving average is performed once on the data shown in FIG. 7E. As shown in FIG. 7A to FIG. 7F, it can be seen that the spike noise is smoothed by the smoothing processing.

Figure 8A:
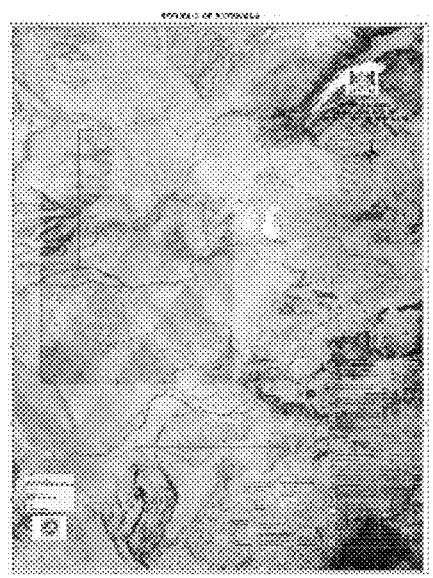
FIG. 8A shows SRTM DEM before filter processing.
Figure 8B:
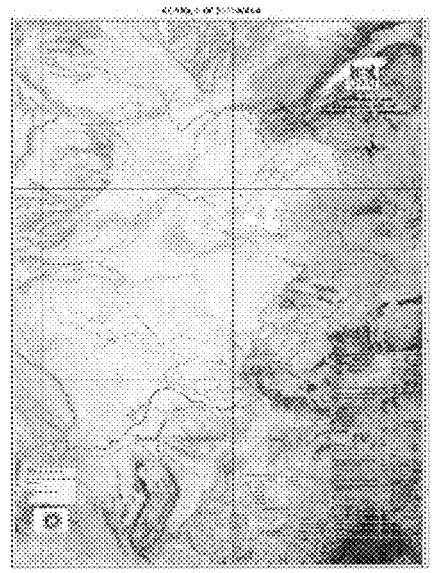
FIG. 8B shows SRTM DEM after the filter processing.

FIG. 8A and FIG. 8B show examples of conducting filter processing of the SRTM DEM. FIG. 8A shows the SRTM DEM before the filter processing by the filter processing section 46. FIG. 8B shows the SRTM DEM after the filter processing by the filter processing section 46. As shown in FIG. 8A and FIG. 8B, a density difference in each region is eliminated through the filter processing by the filter processing section 46, and the filter processing can be recognized to be effective.

FIG. 9A and FIG. 9B are slope gradation maps generated from the SRTM DEM. Specifically, FIG. 9A shows the slope gradation map generated by the SRTM DEM before the filter processing is conducted by the filter processing section 46. FIG. 9B shows the slope gradation map generated from the SRTM DEM after the filter processing is conducted by the filter processing section 46. It can be seen that the slope gradation map shown in FIG. 9B shows a geological feature and a geological structure more clearly than the slope gradation map shown in FIG. 9A.

FIG. 10 shows a geologic map of the same region as the slope gradation maps shown in FIG. 9A and FIG. 9B. Because the geological feature and the geological structure became clearer by the filter processing, it can be seen from the slope gradation map shown in FIG. 9B that a river is formed along with a dike shown in the geological map of FIG. 10.

Figure 11A:
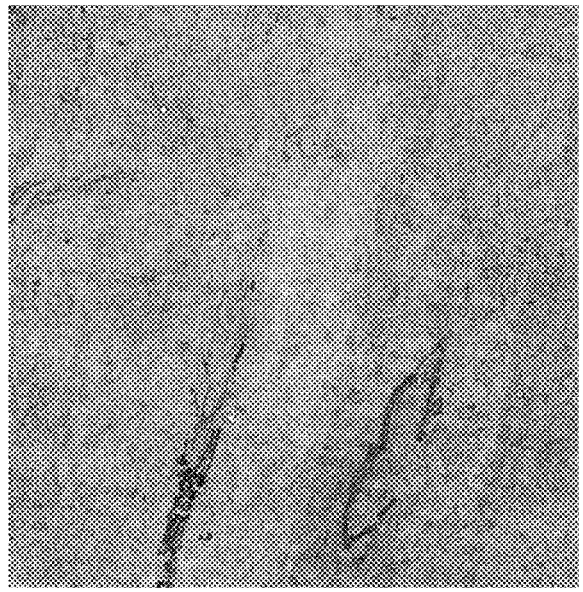
FIG. 11A shows a slope gradation map generated by DEM data obtained by conducting filter processing without smoothing.
Figure 11B:
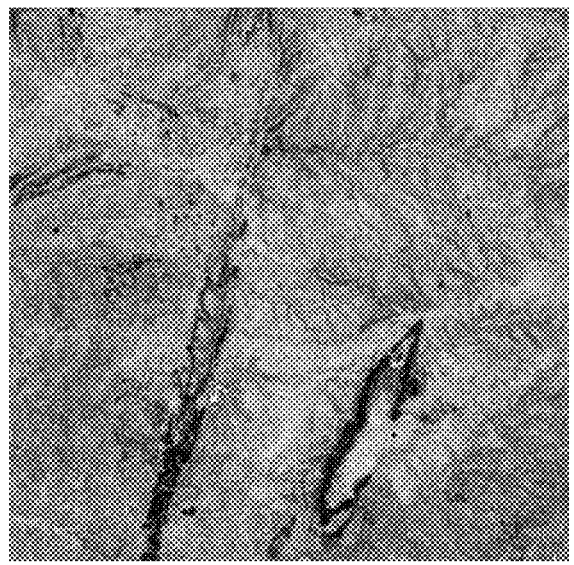
FIG. 11B shows a slope gradation map generated by DEM data obtained by conducting filter processing after the smoothing.

FIG. 11 shows a slope gradation map generated from the ASTER GDEM. Specifically, FIG. 11A shows the slope gradation map generated from the DEM data obtained by conducting the filter processing without smoothing by the smoothing processing section 45. FIG. 11B shows the slope gradation map generated from the DEM data obtained by conducting the filter processing after the smoothing by the smoothing processing section 45. It can be seen that the slope gradation map shown in FIG. 11B shows a geological feature and a geological structure more clearly than the slope gradation map shown in FIG. 11A.

[Effects of Exemplary Embodiment]

As described above, the image processing apparatus 1 according to the present exemplary embodiment selects at least one of a plurality of line filters that filters data which is continuous in one direction in a map region and a plurality of matrix filters that constitutes a two-dimensional region in a map region, and conducts filter processing of the acquired DEM data by the selected filter.

In this manner, the image processing apparatus 1 can efficiently select at least one filter from a plurality of effective line filters and a plurality of effective matrix filters as a filter which is suitable for removing noise from each of many pieces of DEM data corresponding to each map region.

Further, the image processing apparatus 1 smooths data of the maximum value in a predetermined window width in the DEM data acquired by the acquiring section 41. In this manner, the image processing apparatus 1 can smooth data of the maximum value that cannot be removed by the line filter or the matrix filter, and so data values, such as, for example, those of spike noise, which are outstanding compared to other data values, can be smoothed.

Further, the image processing apparatus 1 calculates the trend of terrain in the predetermined map region indicated by the DEM data acquired by the acquiring section 41 and selects at least one of the a plurality of line filters and a plurality of matrix filters on the basis of the calculated trend of terrain. In this manner, the image processing apparatus 1 can select a filter suitable for the terrain according to the trend of terrain.

Further, the image processing apparatus 1 determines a window width on the basis of the calculated trend of terrain. In this manner, the image processing apparatus 1 can optimize a data range for conducting a smoothing according to the terrain.

Further, the image processing apparatus 1 determines a number of times that smoothing is performed on the basis of the calculated trend of terrain. In this manner, the image processing apparatus 1 can conduct smoothing processing a number of times suitable for the calculated trend of terrain and can effectively remove noise.

Further, the image processing apparatus 1 smooths in one direction in the map region indicated by the DEM data as well as in a direction orthogonal to the one direction and calculates the average value of results of each smoothing. In this manner, noise can be effectively removed compared to the case when smoothing is conducted only in one direction even when a plurality of instances of spike noise is contained continuously in one direction because the image processing apparatus 1 can conduct smoothing processing in a direction orthogonal to the one direction.

Further, the image processing apparatus 1 stores a position of a predetermined map region indicated by DEM data and the number of pieces of ASTER data used for generating ASTER GDEM data in that position in association with each other in the storage section 30, and specifies the number of pieces of ASTER data used for generating the DEM data acquired by the acquiring section 41 by referring to the storage section 30, and determines the number of times smoothing is performed on the basis of the specified number of pieces of ASTER data. Here, DEM data indicating a map region, in which the specified number of pieces of ASTER data is small, has lower data accuracy, and contains many noise components compared with DEM data indicating a map region in which the specified number of pieces of ASTER data is large. On this issue, the image processing apparatus 1 can perform smoothing a suitable number of times according to, for example, the specified number of pieces of ASTER data.

Further, the image processing apparatus 1 sets a file name of a file for storing the DEM data after being filtered in the filter processing to be a file name generated by appending identification information of a filter selected by the selecting section 43 to a file name of a file that stores DEM data before the filter processing, and outputs the DEM data after being filtered in the filter processing to the file whose file name was set. In this manner, a user of DEM data outputted by the image processing apparatus 1 can know contents of the filter processing by the file name.

The present invention is described with the exemplary embodiments of the present invention but the technical scope of the present invention is not limited to the scope described in the above embodiment. It is apparent for those skilled in the art that it is possible to make various changes and modifications to the embodiment.

What is claimed is:

1. An image processing apparatus comprising: a memory; and a processor performs following:
   an acquiring section that acquires DEM data indicating digital elevation of each lattice-shaped area in a predetermined map region;
   a trend calculating section that calculates any of slope amounts, a standard deviation of the elevation, a variance of the elevation, and relief amounts of the predetermined map region as one of trends of terrain in the predetermined map region indicated by the DEM data acquired by the acquiring section;
   a selecting section that selects at least one of a plurality of line filters that filters data which is continuous in one direction in the map region and a plurality of matrix filters that filters data constituting a two-dimensional region in the map region on the basis of the one of trends of terrain calculated by the trend calculation section;
   a filter processing section that conducts filter processing of the DEM data acquired by the acquiring section by a filter selected by the selecting section; and
   an outputting section that outputs the DEM data after being filtered in the filter processing.

2. An image processing apparatus according to claim 1, further comprising:
   a smoothing processing section that smooths data of a maximum value in a predetermined window width in the DEM data acquired by the acquiring section, wherein
   the filter processing section conducts filter processing of the DEM data smoothed by using the filter selected by the selecting section.

3. An image processing apparatus according to claim 1, wherein the trend calculating section divides the predetermined map region into a plurality of regions and calculates the trend of terrain for each of the plurality of divided regions, wherein the selecting section selects at least one of the plurality of line filters and the plurality of matrix filters on the basis of the calculated trend of terrain for each of the plurality of regions.

4. An image processing apparatus according to claim 2, wherein:

the trend calculating section calculates the trend of terrain in the predetermined map region indicated by the DEM data acquired by the acquiring section; and the smoothing processing section determines the window width on the basis of the calculated trend of terrain.

5. An image processing apparatus according to claim 2, wherein the trend calculating section calculates the one of trends of terrain in the predetermined map region indicated by the DEM data acquired by the acquiring section, wherein the smoothing processing section determines the number of times the smoothing is conducted on the basis of the calculated trend of terrain.

6. An image processing apparatus according to claim 2, wherein the smoothing processing section smooths in one direction in the predetermined map region indicated by the DEM data as well as in a direction orthogonal to the one direction, and calculates an average of results of each smoothing.

7. An image processing apparatus according to claim 2, further comprising:

a storage section that stores a position of the predetermined map region indicated by DEM data and the number of pieces of satellite image data used for generating the DEM data at the position, wherein the smoothing processing section specifies the number of pieces of the satellite image data used for generating the DEM data acquired by the acquiring section by referring to the storage section, and determines the number of times smoothing is performed on the basis of the specified number of pieces of satellite image data.

8. An image processing apparatus according to claim 1, wherein the outputting section generates a file with a file name made by appending identification information of the filter selected by the selecting section to a file name of a file that stores the DEM data before the filter processing, and outputs the DEM data after being filtered in the filter processing to the file.

9. An image processing method comprising:

acquiring DEM data indicating digital elevation of each lattice-shaped area in a predetermined map region;

calculating any of slope amounts, a standard deviation of the elevation, a variance of the elevation, and relief amounts of the predetermined map region as one of trends of terrain in the predetermined map region indicated by the DEM data acquired in the acquiring;

selecting at least one of a plurality of line filters that filters data which is continuous in one direction in the map region and a plurality of matrix filters that filters data consisting a two-dimensional region in the map region on the basis of the one of trends of terrain calculated by the trend calculation section;

conducting filter processing of the DEM data acquired by the acquiring by a filter selected by the selecting; and outputting the DEM data after being filtered in the filter processing.

10. An image processing method according to claim 9, further comprising:

smoothing data of a maximum value in a predetermined window width in the DEM data acquired by the acquiring, wherein the conducting filter processing conducts filter processing of the DEM data smoothed by using a filter selected by the selecting.

11. An image processing method according to claim 9, wherein the calculating a trend of terrain divides the predetermined map region into a plurality of regions and calculates respective trends of terrain of the divided plurality of regions, wherein the selecting selects at least one or more than one of the plurality of line filters and the plurality of matrix filters on the basis of the calculated trend of terrain for each of the plurality of regions.

12. An image processing method according to claim 10, wherein:

the calculating the trend of terrain includes calculating the trend of terrain in the predetermined map region indicated by the DEM data acquired by the acquiring; and the smoothing determines the window width on the basis of the calculated trend of terrain.

13. An image processing method according to claim 10, wherein the calculating the trend of terrain includes calculating the one of trends of terrain in the predetermined map region indicated by the DEM data acquired by the acquiring, wherein the smoothing determines the number of times the smoothing is performed on the basis of the calculated trend of terrain.

14. An image processing method according to claim 10, wherein the smoothing smooths in one direction in the predetermined map data indicated by the DEM data as well as in a direction orthogonal to the one direction, and calculates an average value of results of each smoothing.

15. An image processing method according to claim 10, wherein the smoothing specifies the number of pieces of satellite image data used for generating the DEM data acquired by the acquiring by referring to a storage section that stores a position of the predetermined map data indicated by DEM data and the number of pieces of satellite image data used for generating the DEM data at the position, and determines the number of times the smoothing is performed on the basis of the specified number of pieces of satellite image data.

16. An image processing method according to claim 9, wherein the outputting generates a file with a file name made by appending identification information of the filter selected in the selecting to a file name of a file that stores the DEM data before the filter processing, and outputs the DEM data after being filtered in the filter processing to the file.

17. A non-transitory computer-readable storage medium which stores an image processing program that causes a computer to execute:

acquiring DEM data indicating digital elevation of each lattice-shaped region in a predetermined map region, calculating any of slope amounts, a standard deviation of the elevation, a variance of the elevation, and relief amounts of the predetermined map region as one of trends of terrain in the predetermined map region indicated by the DEM data acquired in the acquiring, selecting at least one of a plurality of line filters that filters data which is continuous in one direction in the map region and a plurality of matrix filters that filters data consisting a two-dimensional region in the map region on the basis of the one of trends of terrain calculated by the trend calculation section, conducting filter processing of the DEM data acquired by the acquiring by a filter selected by the selecting, and outputting the DEM data after being filtered in the filter processing.

* * * * *